United States Patent
Helling et al.

[11] Patent Number: 6,102,997
[45] Date of Patent: Aug. 15, 2000

[54] INK JET SYSTEM

[75] Inventors: Günter Helling, Odenthal; Jörg Hagemann, Köln; Beate Weber, Leichlingen, all of Germany

[73] Assignee: Agfa Gevaert N.V., Belgium

[21] Appl. No.: 09/087,183

[22] Filed: May 29, 1998

[30] Foreign Application Priority Data

Jun. 6, 1997 [DE] Germany .......................... 197 23 779

[51] Int. Cl.[7] .................................................. C09D 11/02
[52] U.S. Cl. ..................................... 106/31.43; 106/31.47; 106/31.48; 106/31.75; 106/31.77; 106/31.78
[58] Field of Search ............................. 106/31.43, 31.47, 106/31.48, 31.75, 31.77, 31.78

[56] References Cited

U.S. PATENT DOCUMENTS

| | | | |
|---|---|---|---|
| 5,073,448 | 12/1991 | Vieira et al. | 428/331 |
| 5,431,722 | 7/1995 | Yamashita et al. | 106/20 R |
| 5,509,957 | 4/1996 | Toan et al. | 106/20 |
| 5,549,740 | 8/1996 | Takahashi et al. | 106/31.43 |
| 5,607,987 | 3/1997 | Winter et al. | 524/91 |
| 5,624,484 | 4/1997 | Takahashi et al. | 106/31.75 |
| 5,626,655 | 5/1997 | Pawlowski et al. | 106/31.27 |
| 5,729,266 | 3/1998 | Malhotra | 347/102 |
| 5,846,306 | 12/1998 | Kubota et al. | 106/31.75 |

FOREIGN PATENT DOCUMENTS

| | | |
|---|---|---|
| 0 273 712 | 7/1988 | European Pat. Off. . |
| 0 373 573 | 6/1990 | European Pat. Off. . |
| 673 784 | 9/1995 | European Pat. Off. . |
| 761 469 | 3/1997 | European Pat. Off. . |
| 802 063 | 10/1997 | European Pat. Off. . |
| 43 37 862 | 5/1994 | Germany . |
| 2 088 777 | 6/1982 | United Kingdom . |

*Primary Examiner*—Helene Klemanski
*Attorney, Agent, or Firm*—Connolly Bove Lodge & Hutz LLP

[57] ABSTRACT

An ink jet system comprising a recording material and at least one colored ink to be applied to the recording material by means of an ink jet nozzle, characterized in that at least either the material or the at least one colored ink contains at least one water-soluble compound of general formulae (I) or (II):

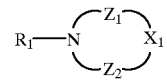

(I)

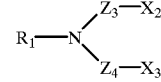

(II)

wherein $R_1$, $Z_1$, $Z_2$, $Z_3$, $Z_4$, $Z_5$, $Z_6$, $X_1$, $X_2$, $X_3$, $X_4$, $X_5$, $R_2$, $R_3$, $R_4$ and n have the meanings given in the description, are distinguished by improved protection of the ink jet dyes from light.

22 Claims, No Drawings

INK JET SYSTEM

This invention relates to an ink jet system with improved properties.

The ink jet process is known (see, for example, the Ink Jet Printing chapter by R. W. Kenyon in "Chemistry and Technology of Printing and Imaging Systems", edited by Peter Gregory, Blackie Academic & Professional, Chapman & Hall 1996, pages 113 to 138, and the literature cited therein).

In the course of this process, ink jet images are produced on a recording material by spraying a dye solution or dye suspension, in a fine jet which is modulated according to the image, on to a recording material. Better quality recording materials comprise an image-receiving layer on a support material. The image-receiving layer contains a medium with which the ink jet dye is to be bonded so that it is diffusion- and wipe-resistant. Moreover, it is necessary to protect the ink jet dyes with light stabilisers. Various classes of substances have already been proposed for this purpose, e.g. water-soluble dialkoxybenzene derivatives (EP 373 573), water-insoluble phenols, bisphenols, hydroquinones and hydroquinone diethers (GB 2 088 777), and water-soluble phenols and bisphenols (DE 43 37 862). In contrast, aminophenol ethers with cyclic aliphatic amine substituents, and aliphatic heterocycles which contain a nitrogen and a sulphur atom simultaneously (EP 273 712) have only been described as hydrophobic, emulsifiable compounds for use in colour photographic material.

The effect of the light stabilisers used hitherto on ink jet printing is unsatisfactory.

The object of the present invention was therefore to improve the protection of ink jet dyes from light. This object is achieved by the use of defined compounds.

The present invention therefore relates to an ink jet system, comprising a recording material and at least one colored ink to be applied to the recording material by means of an ink jet nozzle, characterized in that at least either the material or the at least one colored ink contains at least one water-soluble compound of general formulae (I) or (II):

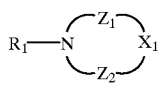

(I)

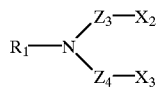

(II)

wherein $R_1$ denotes H, alkyl, aryl, alkoxy, aryloxy or hydroxy, $Z_1$ denotes $C_1$–$C_5$-alkylene, $Z_2$ denotes $C_1$–$C_5$-alkylene or —$Z_5$—$X_4$—$Z_6$—, $Z_3$, $Z_4$ denote $C_1$–$C_6$-alkylene, $Z_5$ denotes $C_1$–$C_4$ alkylene, $Z_6$ denotes a single bond, methylene or ethylene, $X_1$, $X_4$ denote

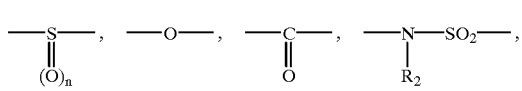

-continued

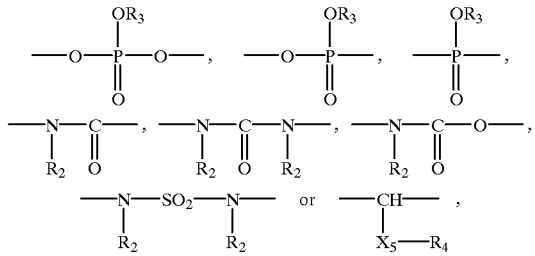

$X_2$ denotes acyl, acyloxy, acylamino, carboxy, sulpho, a phosphoric acid residue, alkoxy, hydroxy or alkyl, $X_3$ denotes H or $X_2$, $X_5$ denotes

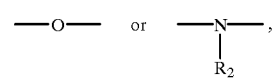

$R_2$ denotes H or alkyl, $R_3$ denotes H, alkyl or aryl, $R_4$ denotes acyl, and n denotes 0, 1 or 2, wherein the compounds which contain an acid group may also exist as the salt, the heterocycle of formula (I) has 5 to 8 ring atoms and the compounds of formulae (I) and (II) have a solubility in water of at least 1 g/l at 20° C. and standard pressure.

The alkyl and alkylene groups can be straight chain or branched, substituted or unsubstituted, wherein suitable substituents include sulpho, carboxy, hydroxy, halogeno, nitro, cyano, acyl, acyloxy, acylamino, alkoxy and aryloxy. The acyl radicals can originate from aliphatic, olefinic or aromatic carboxylic, carbonic, carbamic, sulphonic, amidosulphonic, phosphoric or phosphonic acids. Aryl and aryloxy groups may be unsubstituted or substituted by substituents as defined under $R_6$.

$R_1$ is alkyl or aryl in particular; $X_1$, $X_4$ are

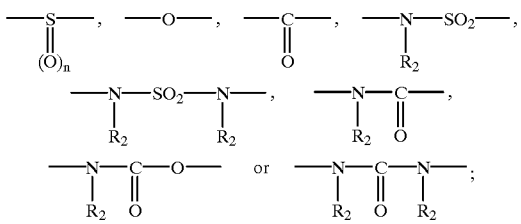

in particular;

$R_2$ is H in particular;

$X_2$ is acyl, acyloxy, acylamino, carboxy, sulpho, hydroxy, alkoxy, —$(OC_2H_4)_m OR_5$ or —$(OC_3H_6)_p OR_5$ in particular, wherein $R_5$ denotes H or $C_1$–$C_4$-alkyl, and m and p denote an integer from 1 to 12.

In one particularly preferred embodiment, at least either the material or the at least one colored ink contains at least one water-soluble compound of general formulae (III) or (IV):

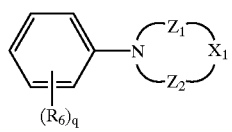
(III)

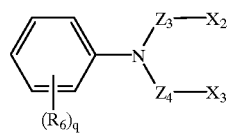
(IV)

wherein $Z_1, Z_2, Z_3, Z_4, X_1, X_2, X_3$ have the meanings given above, $R_6$ denotes alkyl, alkoxy, acyl, acyloxy, acylamino, sulpho, carboxy or hydroxy, and q denotes 0 or an integer from 1 to 5.

The alkyl, alkoxy, acyl, acyloxy and acylamino groups $R_6$ may be substituted e.g. by sulpho, carboxy, sulphoalkylamino, hydroxy and other groups.

In formula (III), $Z_1$ and $Z_2$ together preferably contain 2 to 4 atoms. $X_1$ in formula (III) is most preferably —SO—, —SO$_2$—, —CO—, —N(R$_2$)SO$_2$—, —O— or —N(R$_2$)SO$_2$N(R$_2$)—. $X_2$ in formula (IV) is most preferably acyl, carboxy, sulpho, hydroxy, —OR$_5$ or —(OC$_2$H$_4)_m$—OR$_5$.

At least one $R_6$ radical in formulae (III) and (IV) is preferably an alkoxy in the o- or p-position.

The solubility of the compounds of formulae (I) to (IV) is at least 1 g/l, preferably at least 10 g/l in water at 20° C. and standard pressure.

The compounds of formulae (I) to (IV) may contain a polymerisable group or a functional group which is capable of linking to a polymer by customary reactions analogous to polymerisation. Compounds of formulae (I) to (IV) containing a polymerisable group may form homo- or copolymers or may be used for the formation of graft polymers.

The polymeric compounds have a solubility in water of at least 1 g/l, preferably 10 g/l at 20° C. and standard pressure.

Examples of suitable comonomers for the production of water-soluble polymers with compounds of formulae (I) to (IV) include: acrylates, methacrylates, vinyl esters, maleic acid esters, acrylamides such as acrylamide, diacetone acrylamide, n-butyl acrylamide, acryloyl morpholine, acrylamido-2-methylpropane sulphonate and vinyl pyrrolidone, methacrylamides such as t-butyl methacrylamide and 2-methoxy methacrylamide, acrylic acid, methacrylic acid, maleic acid, fumaric acid, vinyl ethers such as methoxyvinyl ethers, styrene, styrenesulphonic acid, ketones such as methyl vinyl ketone, and heterocyclic compounds such as vinyl pyridine.

Examples of polymers which are suitable for polymeric reactions or which form graft polymers include polyacrylic acid or polymethacrylic acids as homo- or copolymers; polyvinyl alcohol and vinyl alcohol copolymers, cellulose and cellulose derivatives, gelatine, acrylated gelatine, polymers which contain epoxy groups, and halogenated polystyrene copolymers.

Examples of compounds of formulae (I) to (IV) include:

I-1

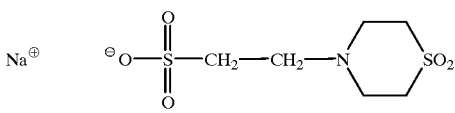

I-2

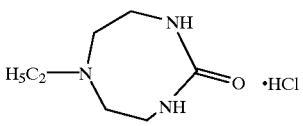

I-3

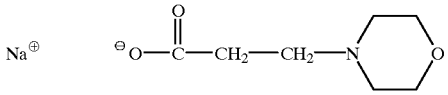

I-4

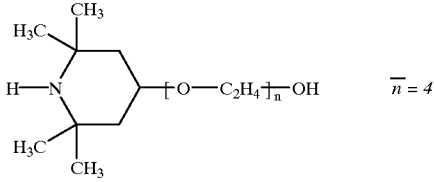

I-5

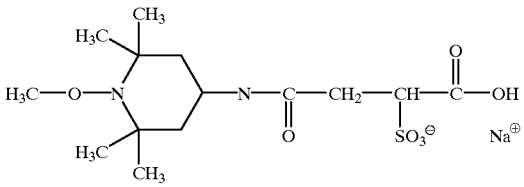

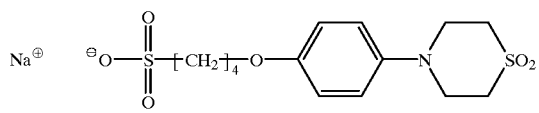
I-6
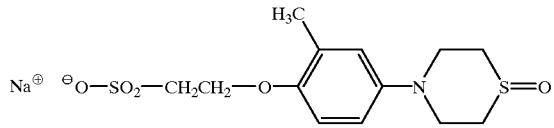
I-7
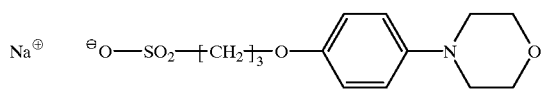
I-8
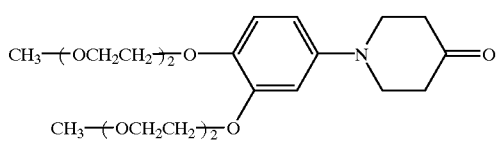
I-9
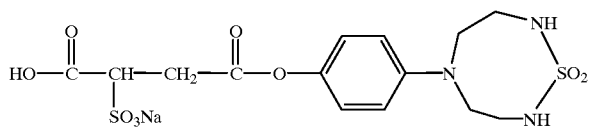
I-10
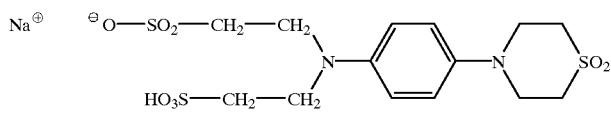
I-11
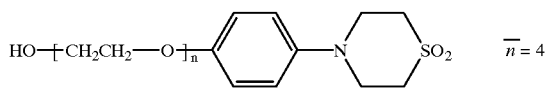
I-12
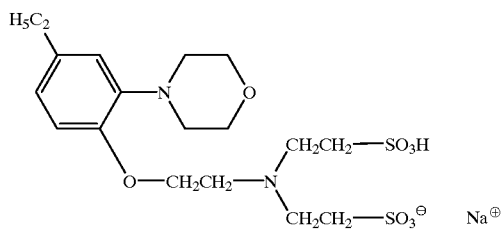
I-13
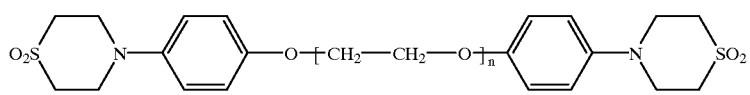
I-14
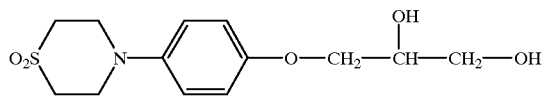
I-15
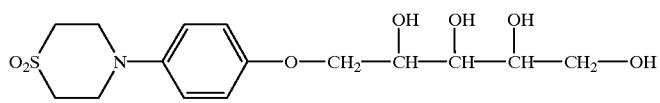
I-16

I-17
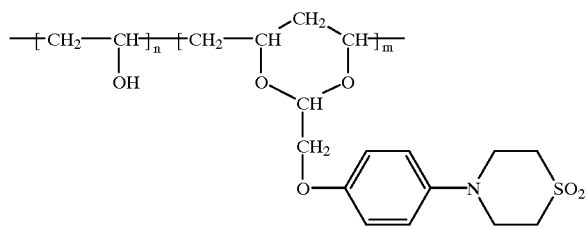
m = 25% by weight
n = 75% by weight
$\overline{M_W}$ = 40,000
I-18
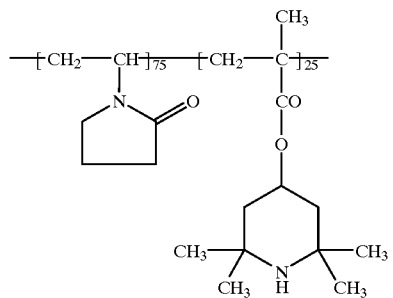
I-19
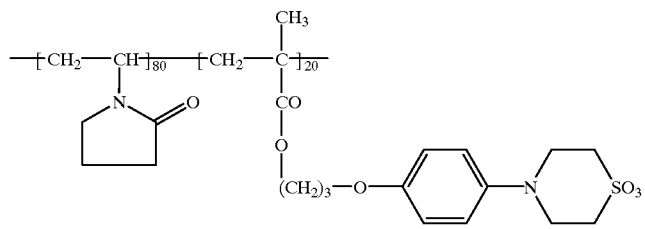
I-20
A copolymer of acrylated gelatine ($M_W$ ~ 3 000) (75% by weight) and
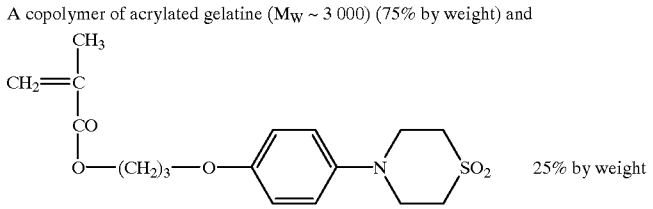 25% by weight
I-21
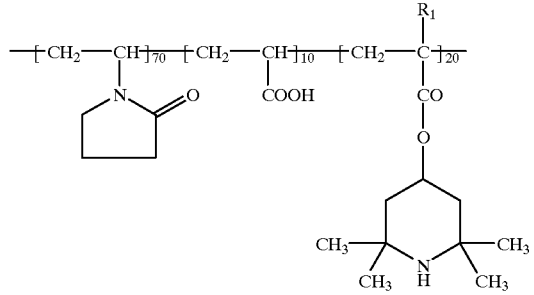

-continued
II-1
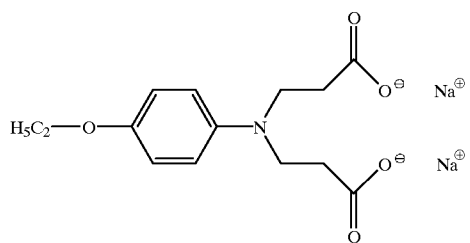
II-2
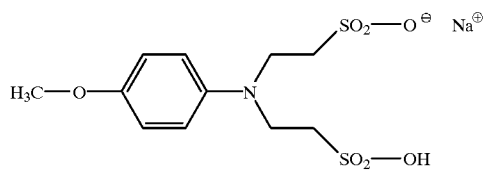
II-3
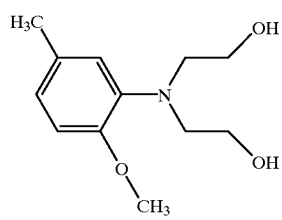
II-4
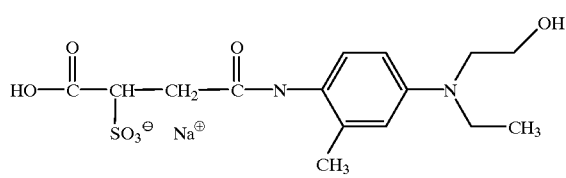
II-5
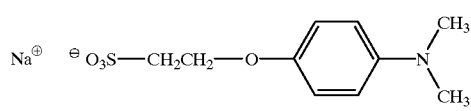
II-6
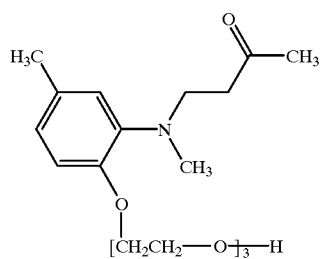
II-7
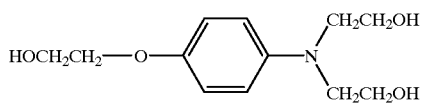
II-8
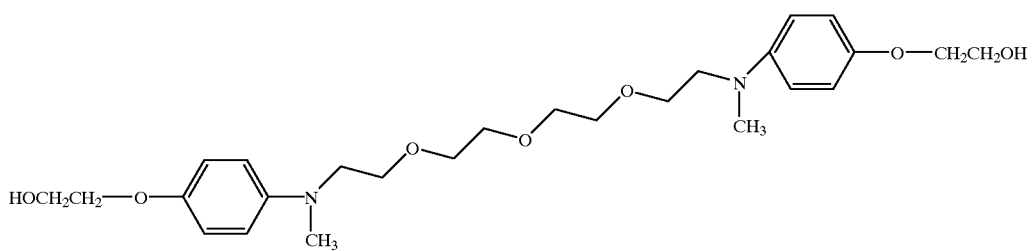

-continued

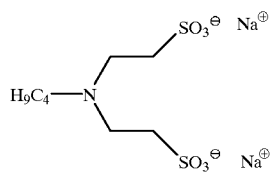

II-9

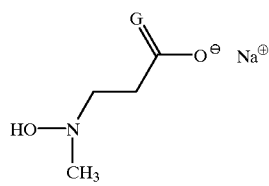

II-10

The solubilities of the cited compounds in water at 20° C. and standard pressure are greater than 10 g/l.

The compounds of formulae (I) to (IV) are used either in the ink jet material or in at least one ink jet ink or in both. Use in the material is preferred. The total amount used is 10 to 5000 mg/m², preferably 50 to 2000 mg/m². They are either added to casting or coating dispersions which are applied by customary techniques to the support of the ink jet material, or they can be absorbed on to the material from an aqueous solution. If the material contains a plurality of layers, the compounds of formulae (I) to (IV) can be added to one layer or can be distributed over a plurality of layers, wherein they can be applied to a plurality of layers in the same or in different concentrations.

If the compounds of formulae (I) to (IV) are added to ink jet inks, the amount per m² which is applied to the material via the ink should fall within the aforementioned range. A concentration from 1 to 200 g/l, particularly 5 to 100 g/l, is preferred in the ink itself Suitable ink jet inks are described in EP 672 538, pages 3 to 6.

In an additional preferred embodiment at least one layer contains an agent which binds ink jet dyes in a diffusion- and wipe-resistant manner.

Suitable agents for this purpose are for example cationic mordants, dye-complexing compounds and aluminium hydroxide.

Cationic mordants are preferred since azo dyes containing acid groups are usually employed as ink jet dyes.

Suitable cationic mordants are for example compounds from the classes comprising optionally quaternised polyvinyl pyrdines, optionally quaternised polyvinyl imidazoles, optionally quaternised poly(di)allylammonium compounds, optionally quaternised polydialkylaminoalkyl (meth)acrylates, optionally quaternised polydialkylammonium alkyl(meth)acrylamides, polyvinylbenzyldi- or trialkyl-ammonium compounds, polyesters containing quaternary ammonium groups, polyamides containing quaternary ammonium groups, polyurethanes containing quaternary ammonium groups and polymers of N,N,N-trialkyl-N-(meth)acrylamido-benzylammonium compounds. Preferred mordants are copolymers of at least 45% by weight of vinyl pyrrolidone and at least 20% by weight of a monomer containing a quaternary nitrogen atom.

The cationic mordants can be soluble or dispersible in water. The cationic mordants have an average molecular weight (weight average) of preferably at least 2000, and in particular at least 20,000.

The mordants used can also be compounds containing phosphonium groups (EP 609 930) as well as ground cationic ion exchange resins which are introduced into the mordant layer in a finely divided form.

Some examples are shown below.

B-1

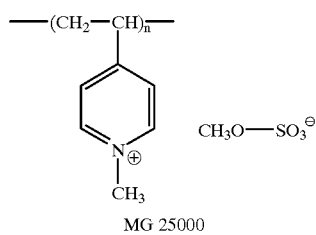

MG 25000

B-2
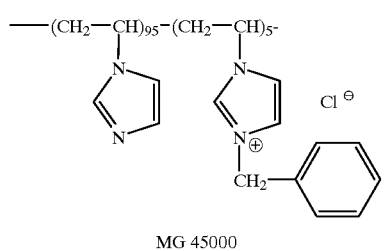
MG 45000
B-3
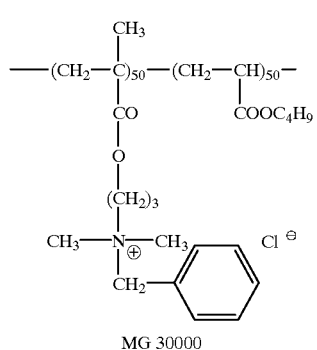
MG 30000
B-4
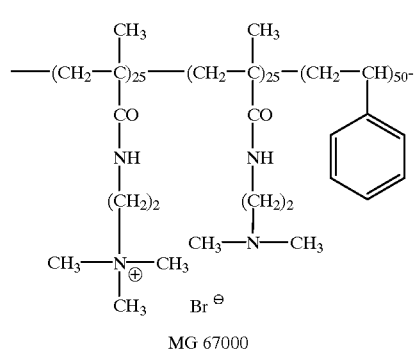
MG 67000
B-5
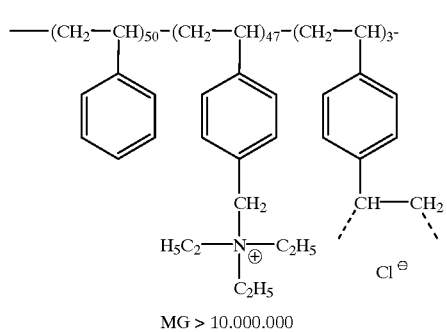
MG > 10.000.000

-continued
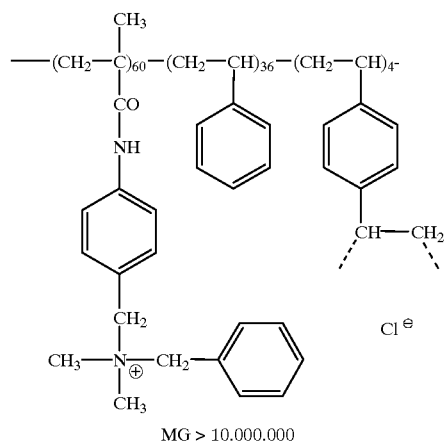
B-6
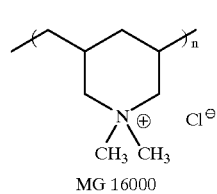
B-7
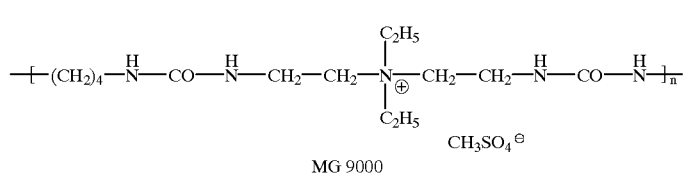
B-8
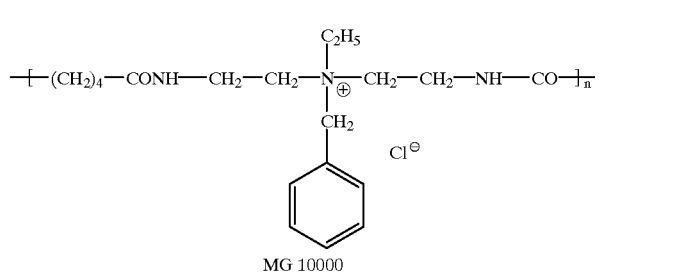
B-9
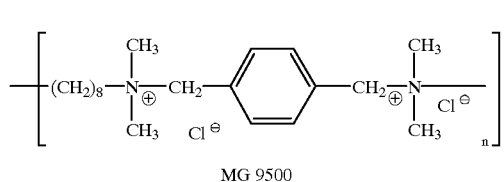
B-10
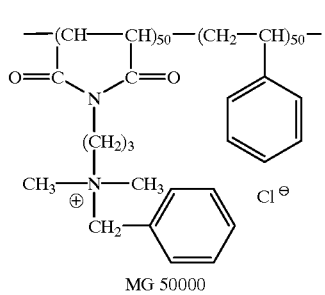
B-11

-continued

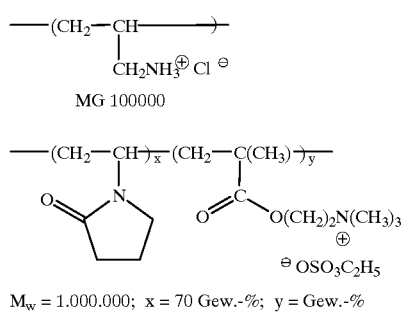

$M_w = 1.000.000$; x = 70 Gew.-%; y = Gew.-%

The dotted bonds in B-5 and B-6 represent the crosslinking of the molecule with other similar chains.

The agents which bind the ink jet dyes in a diffusion- and wipe-resistant manner are used in a quantity of 10 to 3,000 mg/m² ink jet material, and preferably 50 to 1,000 g/m².

Suitable binders for the layers applied are for example gelatines and gelatine derivatives, polyvinyl pyrrolidone, polyvinyl alcohol, cellulose and cellulose derivatives, albumin, casein, starch and starch derivatives, Na alginate, polyethylene imine, polyvinylpyridinium halide and water-soluble polyurethanes and polyesters. The binders should be capable of being hardened.

Gelatines or mixtures of gelatines with for example gelatine derivatives, such as phthaloyl gelatines, cellulose derivatives such as hydroxyethyl cellulose or polyvinyl pyrrolidone are preferred.

The ink jet recording material can also contain spacers, UV absorbers, dye stabilisers, optical brighteners, wetting agents, emulsifiers and biocides.

Suitable spacers are in particular spherical, have an average diameter of 1 to 50 μm, and in particular 5 to 20 μm, and have a narrow particle size distribution.

Suitable spacers consist for example of polymethyl methacrylate, polystyrene, polyvinyl toluene, silicon dioxide and insoluble starch.

The support preferably has a thickness of 80 to 250 μm; in the case of polyester or polyolefine-lamninated paper the paper has in particular a thickness of 80 to 220 μm and the polyester or the polyolefine layers have in particular a thickness of in each case 5 to 30 μm. Polyethylene is the preferred polyolefine and polyethylene terephthalate the preferred polyester.

In order to prevent buckling of the ink jet recording material the support can also be coated with at least one binder layer side facing the receptor layer. Preferably the binder or binder mixture is the same as that on the receptor side.

Suitable UV absorbers are described in Research Disclosure 24239 (1984), 37254, part 8 (1995), page 292, 37038, part X (1995), page 85 and 38957, part VI (1996), page 607 and EP 306 083 and 711 804. These compounds are preferably introduced into the layer(s) farthest removed from the support.

Particularly preferably the UV absorbers are contained in a layer above the layer(s) containing the compounds of the formulae (I) to (IV).

The UV absorbers can be soluble or insoluble in water. They are used either in the form of solids dispersed with the aid of suitable dispersing agents or in an emulsified form, optionally together with high-boiling solvents, using suitable emulsifiers.

Examples of suitable UV absorbers are:

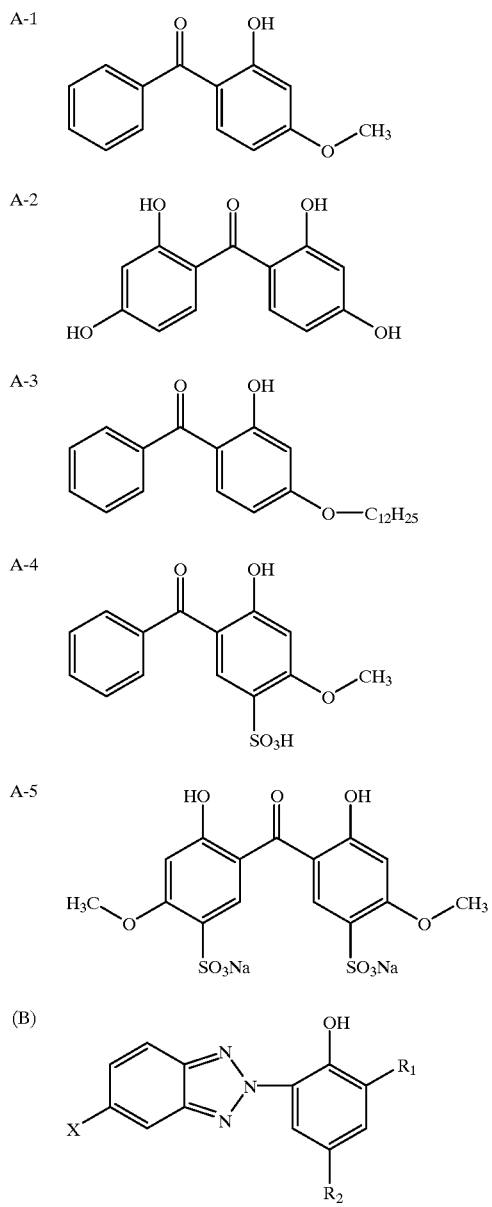

| | | | |
|---|---|---|---|
| B-1 | $R_1$ = s-$C_4H_9$ | $R_2$ = t-$C_4H_9$ | X = H |
| B-2 | $R_1$ = $R_2$ = t-$C_4H_9$ | | X = Cl |
| B-3 | $R_1$ = $R_2$ = t-$C_5H_{11}$ | | X = H |
| B-4 | $R_1$ = H | $R_2$ = t-$C_8H_{17}$ | X = H |
| B-5 | $R_1$ = t-$C_{12}H_{25}$ | $R_2$ = $CH_3$ | X = H |
| | | (mixture of isomers) | |
| B-6 | $R_1$ = t-$C_4H_9$ | $R_2$ = —$CH_2CH_2$—$CO_2$—$C_8H_{17}$ | X = Cl |

(C)

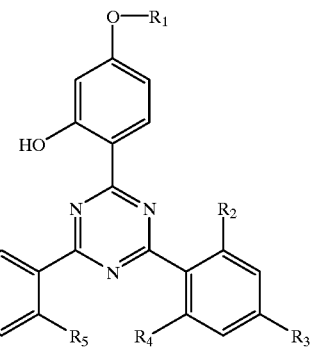

C-1  $R_1$ = $C_8H_{17}$, $R_2$ '2 $R_3$ = $R_5$ = $R_6$ = $CH_3$, $R_4$ = H
C-2  $R_1$ = $C_6H_{13}$, $R_2$–$R_6$ = H
C-3  $R_1$ = —$CH_2$—CH(OH)—$CH_2$—O—$C_{12-16}H_{25-33}$ (mixture)
     $R_2$ = $R_3$ = $R_4$ = $R_5$ = $R_6$ = H
C-4  $R_1$ = —$CH_2$—CH(OH)—$CH_2$—O—$C_4H_9$
     $R_2$ = $R_3$ = $R_4$ = $CH_3$, $R_5$ = OH,
     $R_6$ = —O—$R_1$
C-5  $R_1$ = —$CH_2$—CH($C_2H_5$)—$C_4H_9$
     $R_2$ = $R_3$ = $R_4$ = H, $R_5$ = OH, $R_6$ = —O—$R_1$
C-6  $R_1$ = —$CH_2$—CH(OH)—$CH_2$—O—$C_4H_9$
     $R_2$ = $R_5$ = OH, $R_3$ = $R_6$ = —O—$R_1$, $R_4$ = H
C-7  $R_1$ = $C_{13}H_{27}$-i, $R_2$ = $R_5$ = OH, $R_3$ = $R_6$ = —O—$R_1$, $R_4$ = H
     (mixture of isomers)

Suitable high-boiling solvents are described on page 292 of Res. Discl. 37 254, part 6 (1995), page 292.

Further suitable image stabilisers are known from Research Disclosure 37254, part 8, (1995), page 292, and 38957, part X (1996), page 621 et seq. as well as DE 43 37 862, EP 373 573, GB 2 088 777, EP 685 345 and EP 704 316.

Suitable optical brighteners are described in Research Disclosure 37 254, part 8 (1995), page 292 et seq. and 38 957, part VI (1996), page 607 et seq. These agents are preferably introduced into a layer below the layer farthest removed from the support and particularly preferably in a layer below the receptor layer or in the substrate.

The binders in the individual layers, and in particular gelatines, can also be crosslinked by suitable compounds, so-called hardening agents, in order to improve the water and scratch resistance of the layers.

Suitable hardening agents are described in Research Disclosure 37 254, part 9 (1995), page 294; 37 038 part XII (1995), page 86 and 38 957, part II B (1996), page 599 et seq.

Examples of hardeners are:

H-1

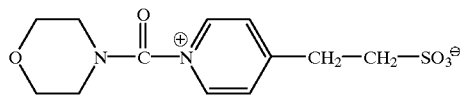

H-2

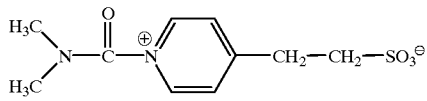

H-3

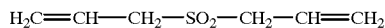

H-4

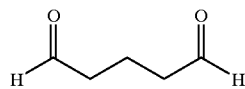

H-5

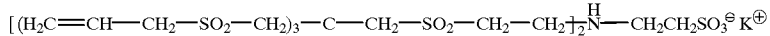

-continued

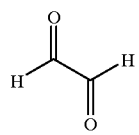
H-6

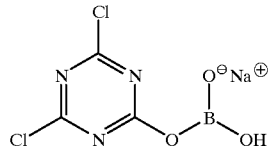
H-7

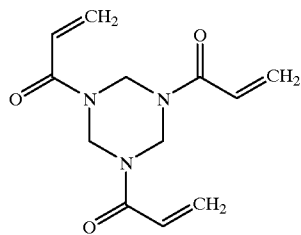
H-8

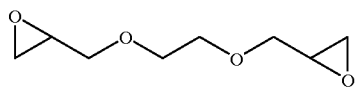
H-9

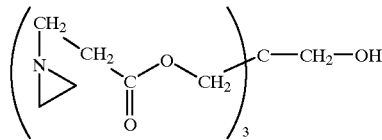
H-10

They are normally used in quantities of 0.005 to 10% by weight, and preferably 0.01 to 1% by weight, based on the binder to be hardened.

The material can be produced in one pass from the support material and a casting solution for each layer to be applied, by means of a cascade or curtain casting device of the kind known from the production of photographic silver halide materials.

After the casting solution(s) has/have been cast on to the support the material is dried and is then ready for use.

The individual layers have a dry layer thickness of 0.1 to 20 μm, and preferably 0.5 to 5 μm.

EXAMPLES

Example 1

Sample 1A

Paper (180 g/m²) coated with polyethylene on both sides was coated using a casting solution so that a dry deposit of 10 g/m² was obtained. The composition of the casting solution was as follows:

| | |
|---|---|
| 6.59 g | poly[1,4-cyclohexylenedimethylene-co-p-xylylene(40/60)-terephthalate-comalonate-co-3,3¢-sodium iminobis-(sulphonylbenzoate)], $M_w \sim 10{,}000$ |
| 2.83 g | polyvinylpyrolidone, $M_w \sim 630{,}000$ |
| 0.20 g | polyethylene oxide, $M_w \sim 6000$ |
| 0.20 g | polyvinyl alcohol, $M_w \sim 49{,}000$ |
| 0.17 g | propylene glycol butyl ether |
| 0.07 g | poly[methyl methacrylate-co-divinylbenzene] particles (average diameter: 15 mm) |
| 90.00 g | water. |
| $M_n$ | is the number average molecular weight; $M_w$ is the weight average molecular weight. |

Samples 1B to 1G

Samples 1B to 1G were prepared as for sample A, except that 0.5 g water in the casting solution was replaced by the compounds listed in Table 1.

The samples were subsequently printed using an ink jet printer (HP 560, Hewlett Packard) so that an area of size 1 cm² was obtained with the maximum application of magenta, cyan or yellow ink. The optical density of the colored areas was measured, they were irradiated with the light from a xenon lamp normalised for daylight ($5.10^6$ lux.hr) and the percentage decrease in density was then determined (Table 1).

The following were used as comparison compounds:

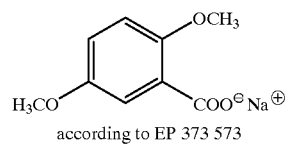
V-I according to EP 373 573

V-2
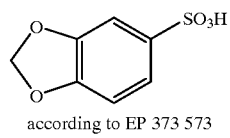
according to EP 373 573

V-3
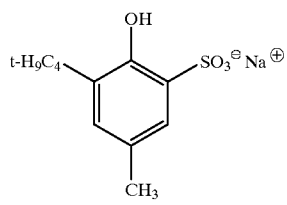
according to DE 43 37 862

V-4
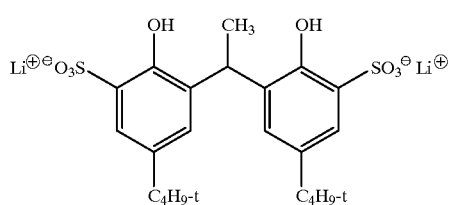
according to DE 43 37 867

V-5
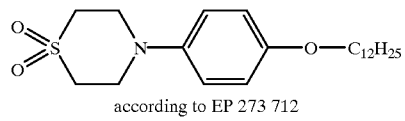
according to EP 273 712

TABLE 1

(C = comparison; I = according to the invention)

| | | Percentage decrease in density | | |
|---|---|---|---|---|
| Sample | Compound | Yellow | Magenta | Cyan |
| 1A (C) | — | −57 | −78 | −90 |
| 1B (C) | V-1 | −51 | −69 | −82 |
| 1C (C) | V-3 | −52 | −72 | −85 |
| 1D (I) | I-8 | −35 | −48 | −61 |
| 1E (I) | I-12 | −30 | −41 | −54 |
| 1F (I) | II-13 | −41 | −58 | −70 |
| 1G (I) | II-7 | −38 | −54 | −66 |

As Table 1 shows, the light stabilisers according to the invention are considerably more effective than the comparison compounds V-1 and V-3.

Example 2

Sample 2A

A recording material for ink jet printing was produced by depositing a layer with the following composition on a support made of paper (200 g/m$^2$) coated on both sides with polyethylene (all quantitative data are given with respect to 1 m$^2$):

| | |
|---|---|
| 9.50 g | gelatine |
| 0.25 g | Mordant B-1 |
| 0.10 g | spreader AH-1 |
| 0.10 g | hardener H-1 |

B-1
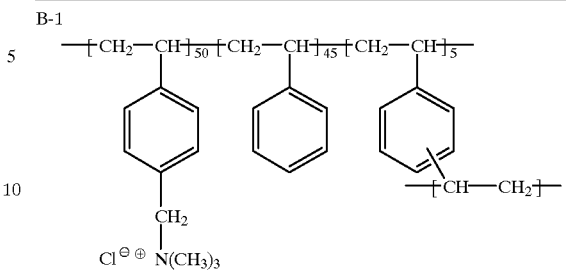
average particle size: 0.1 μm

AH-1
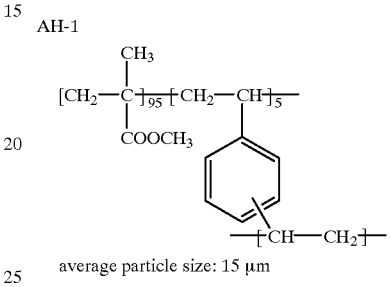
average particle size: 15 μm

Sample 2B

Sample 2B was produced as for sample 2A, except that 1 g/m$^2$ of comparison compound V-5 was added, in emulsified form (high-boiling solvent: tricresyl phosphate (1 g/m$^2$), wetting agent: diisobutylnaphthalenedisulphonic acid, disodium salt), to the layer.

Samples 2C to 2I

Samples 2C to 2I were produced as for sample 2A, except that 1 g/m$^2$ of the compounds listed in Table 2 was added to the layer.

All the samples were subsequently printed using an ink jet printer (HP 850, Hewlett Packard) so that an area of size 1 cm$^2$ was obtained with the maximum application of yellow, magenta or cyan ink. The optical density of the colored areas was measured, they were irradiated with the light from a xenon lamp normalised for daylight (10.10$^6$ lux.hr) and the percentage decrease in density was then determined (Table 2).

TABLE 2

(C = comparison; I = according to the invention)

| | | Percentage decrease in density | | |
|---|---|---|---|---|
| Sample | Compound | Yellow | Magenta | Cyan |
| 2A (C) | — | −80 | −39 | −42 |
| 2B (C) | V-5 | −81 | −39 | −41 |
| 2C (C) | V-2 | −70 | −33 | −37 |
| 2D (C) | V-4 | −66 | −34 | −35 |
| 2E (I) | I-6 | −41 | −22 | −25 |
| 2F (I) | I-9 | −49 | −25 | −28 |
| 2G (I) | I-17 | −44 | −24 | −26 |
| 2H (I) | II-2 | −52 | −27 | −29 |
| 2I (I) | II-5 | −58 | −30 | −31 |

As Table 2 shows, the compounds according to the invention are considerably more suitable as light stabilisers than are the comparison compounds.

Example 3

Sample 3A

A recording material for ink jet printing was produced by applying the following layers to a support consisting of paper coated on both sides with polyethylene (180 g/m²) (the quantities mentioned are per 1 m²):

| Layer 1 | |
|---|---|
| 5.0 g | gelatine |
| 0.25 g | mordant B-1 |
| 1.0 g | dye stabiliser (cf. Table 3) |
| Layer 2 | |
| 1.5 g | gelatine |
| 0.5 g | UV absorber (cf. Table 3) |
| 0.25 g | high-boiling solvent (cf. Table 3) |
| Layer 3 | |
| 0.8 g | gelatine |
| 0.2 g | hydroxyethyl cellulose |
| 0.2 g | spacer AH-1 |
| 0.006 g | hardener H-4 |

Samples 3B–3F

Samples 3B–3F were produced in the same way as sample 3A except that the compounds mentioned in Table 3 were added to layers 1 and 2.

Then all the samples were printed with an ink jet printer (HP 870, Hewlett Packard) in such a manner that an area of a size of in each case 1 cm² was obtained with the application of maximum quantities of yellow, magenta and cyan ink. The optical density of the colored area was measured, irradiated with the light from a xenon lamp normalised for daylight ($10 \cdot 10^6$ lux$^h$) and then the percentage decrease in density and the increase in yellow density of an unprinted area was determined (cf. Table 3).

TABLE 3

(C: comparison; I: according to the invention)

| | | | high-boiling | % | | | yellow |
|---|---|---|---|---|---|---|---|
| Sample | Dye stabiliser | UV absorber | solvent | yellow | magenta | cyan | density |
| 3A (C) | none | none | none | −83 | −52 | −66 | 0.08 |
| 3B (C) | none | A-5 | none | −79 | −46 | −63 | 0.07 |
| 3C (C) | none | B-1 | TCP* | −77 | −45 | −62 | 0.06 |
| 3D (I) | I-6 | none | none | −52 | −31 | −39 | 0.12 |
| 3E (I) | I-6 | A-5 | none | −50 | −31 | −38 | 0.07 |
| 3F (I) | I-15 | B-1 | TCP* | −53 | −32 | −37 | 0.06 |

*tricresyl phosphate

The additional use of an UV absorber prevents yellowing occurring on irradiation.

What is claimed is:

1. An ink jet system comprising a recording material and at least one colored ink to be applied to the recording material by means of an ink jet nozzle, at least either the material or at least one colored ink contains at least one water-soluble compound of formulae (I) or (II):

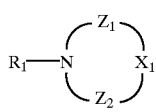
(I)

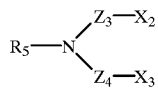
(II)

wherein $R_1$ is H, alkyl, aryl, alkoxy, aryloxy or hydroxy, $R_5$ is H, alkyl, aryl, alkoxy, aryloxy or hydroxy, $Z_1$ is $C_1$–$C_5$-alkylene, $Z_2$ is $C_1$–$C_5$-alkylene or $Z_5$—$X_4$—$Z_6$—, $Z_3$ and $Z_4$ are identical or different and are $C_1$–$C_6$-alkylene, $Z_5$ is $C_1$–$C_4$ alkylene, $Z_6$ is a single bond, methylene or ethylene, $X_1$ is

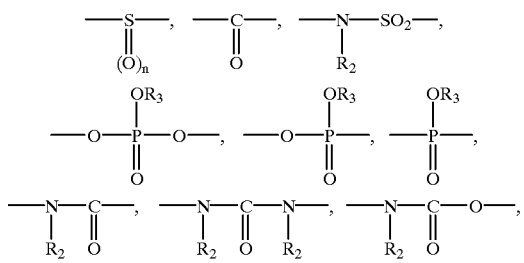

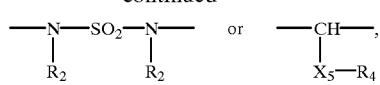

$X_2$ is acyl, acyloxy, acylamino, carboxy, a phosphoric acid residue, alkoxy, hydroxy or alkyl, $X_3$ is H or $X_2$, $X_4$ is

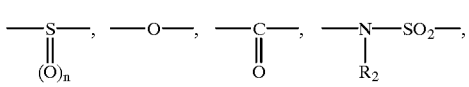

-continued

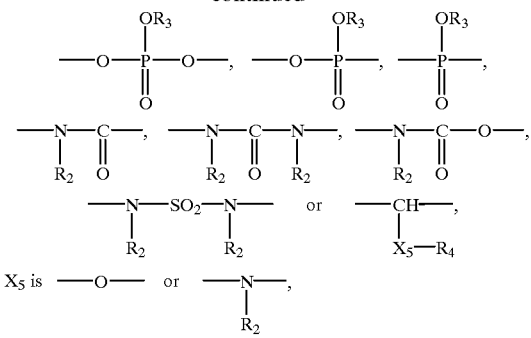

X₅ is —O— or —N—
                    |
                    R₂

R₂ is H or alkyl,
R₃ is H, alkyl or aryl,
R₄ is acyl, and
n is 1 or 2, wherein the compounds which contain an acid group may also exist as the salt, the heterocycle of formula (I) has 5 to 8 ring atoms, and the compounds of formulae (I) and (II) have a solubility in water of at least 1 g/l at 20° C. and standard pressure, and if $R_5$ is alkyl, said alkyl group is a straight chain or branched, substituted or unsubstituted, wherein said substituents are selected from the group consisting of hydroxy, halogeno, nitro, cyano, acyl, acyloxy, acylamino, alkoxy and aryloxy.

2. An ink jet system comprising a recording material and at least one colored ink to be applied to the recording material by means of an ink met nozzle, at least either the material or at least one colored ink contains at least one water-soluble compound of formulae (I) or (II):

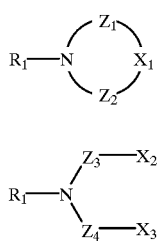

wherein
R₁ is H, alkyl, aryl, alkoxy, aryloxy or hydroxy,
Z₁ is C₁–C₅-alkylene,
Z₂ is C₁–C₅-alkylene or Z₅—X₄—Z₆—,
Z₃ and Z₄ are identical or different and are C₁–C₅-alkyene,
Z₅ is C₁–C₄ alkylene,
Z₆ is a single bond, methylene or ethylene,
X₁ and X₄ are identical or different and are

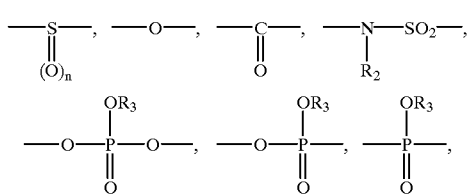

-continued

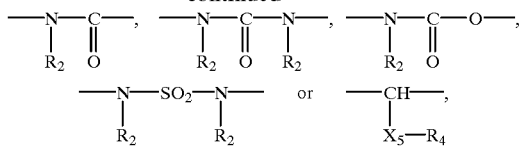

and at least one colored ink contains at least one water-soluble compound of formulae (III) or (IV):

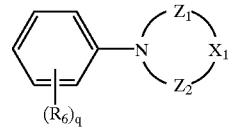  (III)

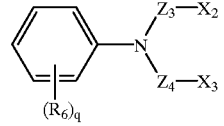  (IV)

wherein
X₂ is acyl, acyloxy, acylamino, carboxy, sulpho, a phosphoric acid residue, alkoxy, hydroxy or alkyl,
X₃ is H or X₂,
X₅ is —O— or

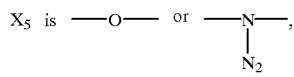

R₂ is H or alkyl,
R₃ is H, alkyl or aryl,
R₄ is acyl,
n is 0, 1 or 2,
Z₁, Z₂, Z₃, Z₄, X₁, X₂, X₃ are defined above,
R₆ is alkyl, alkoxy, acyl, acyloxy, acylamino, sulpho, carboxy or hydroxy, and
q is 0 or an integer from 1 to 5.

3. The ink jet system according to claim 1, wherein the compounds (I) to (II) have a solubility in water at 20° C. and standard pressure of at least 10 g/l.

4. The ink jet system according to claim 2, wherein at least one R₆ radical in formulae (III) and (IV) is an alkoxy radical in the o- or p-position.

5. The ink jet system according to claim 1, wherein the compounds of formulae (I) or II are used in the ink jet material or in at least one ink jet ink, or both in the ink jet material and in at least one ink jet ink.

6. The ink jet system according to claim 5, wherein the compounds of formulae (I) to (II) are used in at least one ink jet ink in a concentration of 1 to 200 g/l.

7. The ink jet system according to claim 2, wherein the compounds (III) to (IV) have a solubility in water at 20° C. and standard pressure of at least 10 g/l.

8. The ink jet system according to claim 2, wherein compounds of the formulae (III) to (IV) are part of a homo-, co- or a graft polymer via a polymerizable or functional group.

9. The ink jet system according to claim 2, wherein the compounds of formulae (III) and (IV) are used in the ink jet material or in at least one ink jet ink, or both in the ink jet material and in at least one ink jet ink.

10. The ink jet system according to claim 9, wherein the compounds of the formulae (III) to (IV) are used in the ink jet material in an amount of 10 to 5000 mg/m$^2$.

11. The ink jet system according to claim 9, wherein the compounds of formulae (III) to (IV) are used in at least one ink jet ink in a concentration of 1 to 200 g/l.

12. The ink jet system according to claim 1, wherein
$R_1$ is alkyl or aryl,
$X_1$ is

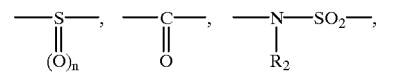

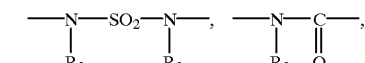

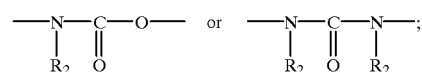

$X_4$ is

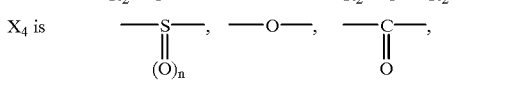

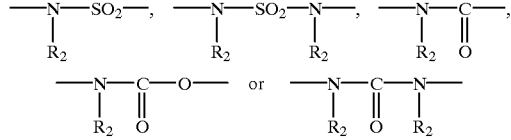

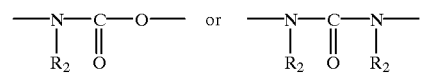

$R_2$ is H,
$X_2$ is acyl, acyloxy, acylamino, carboxy, sulpho, hydroxy, alkoxy, —$(OC_2H_4)_m OR_5$ or —$(OC_3H_6)_p OR_5$, wherein $R_5$ denotes H or $C_1$–$C_4$-alkyl, and
m and p denote are identical or different and are an integer from 1 to 12.

13. The ink jet system according to claim 2, wherein $Z_1$ and $Z_2$ together contain two to four atoms, $X_1$ is —SO—, —SO$_2$—, —CO—, —N(R$_2$)SO$_2$—, —O— or —N(R$_2$)SO$_2$N(R$_2$)— and $X_2$ is acyl, carboxy, sulpho, hydroxy, —OR$_5$ or —(OC$_2$H$_4$)$_m$—OR$_5$,
wherein
$R_5$ is H or $C_1$–$C_4$-alkyl and m is an integer from 1 to 12.

14. An ink jet system comprising a recording material and at least one colored ink to be applied to the recording material by means of an ink jet nozzle, at least either the material or at least one colored ink contains at least one water-soluble compound of formulae (I) or (II):

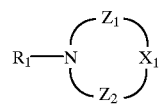
(I)

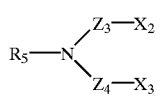
(II)

wherein
$R_1$ is H, alkyl, aryl, alkoxy, aryloxy or hydroxy,
$Z_1$ is $C_1$–$C_5$-alkylene,
$Z_2$ is $C_1$–$C_5$-alkylene or $Z_5$—$X_4$—$Z_6$—,
$Z_3$ and $Z_4$ are identical or different and are $C_1$–$C_6$-alkylene, $Z_5$ is $C_1$–$C_4$ alkylene,
$Z_6$ is a single bond, methylene or ethylene,
$X_1$ is

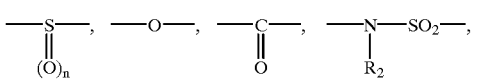

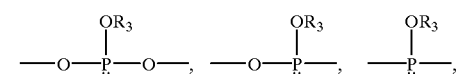

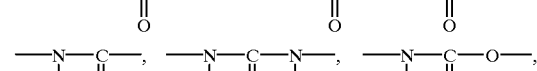

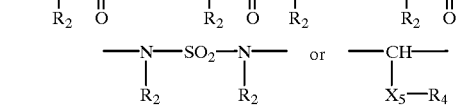

$X_2$ is acyl, acyloxy, acylamino, carboxy, sulpho, a phosphoric acid residue, alkoxy, hydroxy or alkyl,
$X_3$ is H or $X_2$,
$X_4$ is

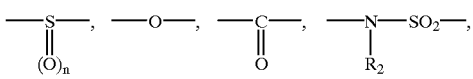

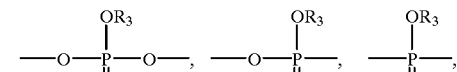

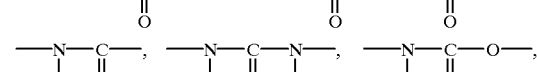

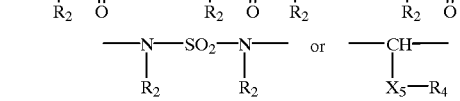

$X_5$ is

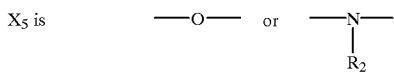

$R_2$ is H or alkyl,
$R_3$ is H, alkyl or aryl,
$R_4$ is acyl, and
n is 0, 1 or 2, wherein the compounds which contain an acid group may also exist as the salt, the heterocycle of formula (I) has 5 to 8 ring atoms and the compounds of formulae (I) and (II) have a solubility in water of at least 1 g/l at 20° C. and standard pressure, and either the material or said at least one colored ink contains a water soluble compound of the formula (III) or (IV)

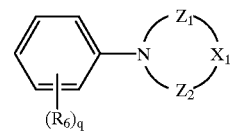
(III)

-continued

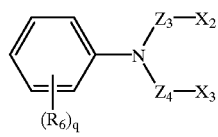
(IV)

wherein

X₁, X₂, X₃, Z₁, Z₂, Z₃ and Z₄ are defined above,

R₅ is alkyl, alkoxy, acyl, acyloxy, acylamino, sulpho, carboxy or hydroxy and at least one R₆ is an alkoxy radical in the o- or p-position.

15. The ink jet system as claimed in claim 14, wherein formula (III) is used and X₁ is —O—.

16. An ink jet system comprising a recording material and at least one colored ink to be applied to the recording material by means of an ink jet nozzle, at least either the material or at least one colored ink contains at least one water-soluble compound of formulae (I) or (II):

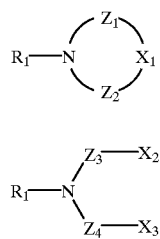
(I)

(II)

wherein

R₁ is H, alkyl, aryl, alkoxy, aryloxy or hydroxy,

Z₁ is C₁–C₅-alkylene,

Z₂ is C₁–C₅-alkylene or Z₅—X₄—Z₆—,

Z₃ and Z₄ are identical or different and are C₁–C₆-alkylene,

Z₅ is C₁–C₄ alkylene,

Z₆ is a single bond, methylene or ethylene,

X₁ is

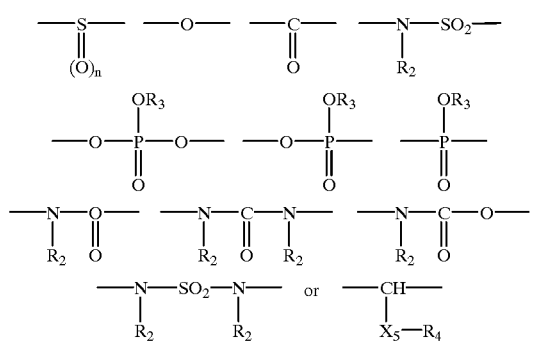

X₂ is acyl, acyloxy, acylamino, carboxy, sulpho, a phosphoric acid residue, alkoxy, hydroxy or alkyl, X₃ is H or X₂, X₄ is

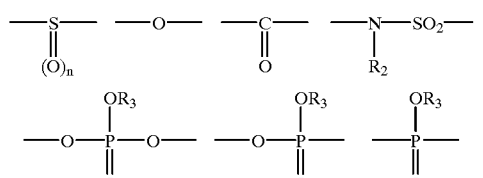
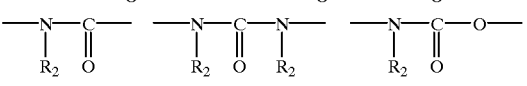
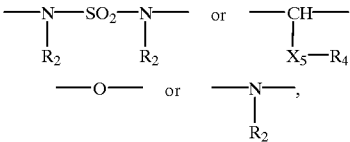
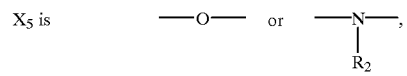

X₅ is  —O—  or  —N—,
                    |
                    R₂

R₂ is H or alkyl,

R₃ is H, alkyl or aryl,

R₄ is acyl, and n is 0, 1 or 2, wherein the compounds which contain an acid group may also exist as the salt, the heterocycle of formula (I) has 5 to 8 ring atoms and the compounds of formulae (I) and (II) have a solubility in water of at least 1 g/l at 20° C. and standard pressure, and the compounds of formula (I) to (II) are part of a homo-, co- or graft polymer via a polymerizable or functional group.

17. An ink jet system comprising a recording material and at least one colored ink to be applied to the recording material by means of an ink jet nozzle, at least either the material or at least one colored ink contains at least one water-soluble compound of formulae (I) or (II):

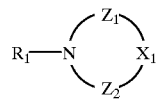
(I)

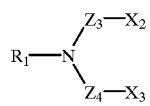
(II)

wherein

R₁ is H, alkyl, aryl, alkoxy, aryloxy or hydroxy,

Z₁ is C₁–C₅-alkylene,

Z₂ is C₁–C₅-alkylene or Z₅—X₄—Z₆—,

Z₃ and Z₄ are identical or different and are C₁–C₆-alkylene,

Z₅ is C₁–C₄ alkylene,

Z₆ is a single bond, methylene or ethylene,

X₁ is

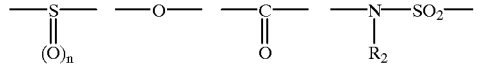

-continued

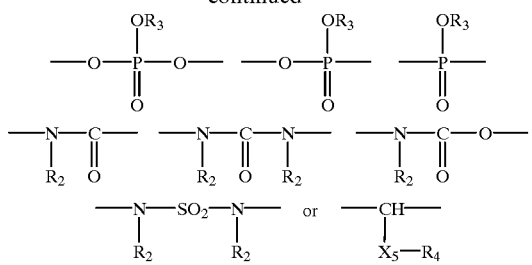

$X_2$ is acyl, acyloxy, acylamino, carboxy, sulpho, a phosphoric acid residue, alkoxy, hydroxy or alkyl, $X_3$ is H or $X_2$, $X_4$ is

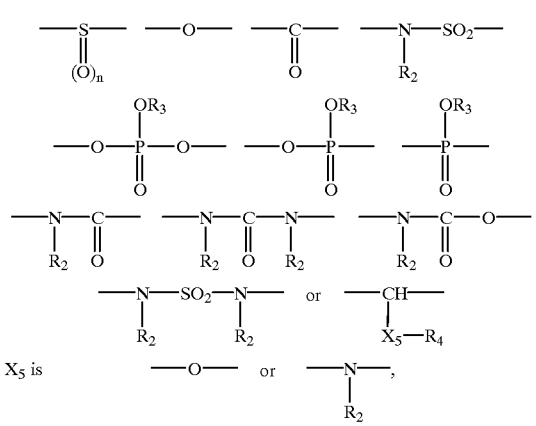

$X_5$ is —O— or —N—,
$\qquad\qquad\qquad\qquad$ |
$\qquad\qquad\qquad\qquad$ $R_2$ $R_2$ is H or alkyl, $R_3$ is H, alkyl or aryl, $R_4$ is acyl, and n is 0, 1 or 2, wherein the compounds which contain an acid group may also exist as the salt, the heterocycle of formula (I) has 5 to 8 ring atoms and the compounds of formulae (I) and (II) have a solubility in water of at least 1 g/l at 20° C. and standard pressure, and the ink jet material contains spacers.

18. An ink jet system comprising a recording material and at least one colored ink to be applied to the recording material by means of an ink jet nozzle, at least either the material or at least one colored ink contains at least one water-soluble compound of formulae (I) or (II):

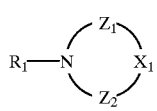 (I)

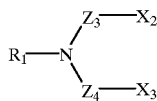 (II)

wherein $R_1$ is H, alkyl, aryl, alkoxy, aryloxy or hydroxy, $Z_1$ is $C_1$–$C_5$-alkylene, $Z_2$ is $C_1$–$C_5$-alkylene or $Z_5$—$X_4$—$Z_6$—, $Z_3$ and $Z_4$ are identical or different and are $C_1$–$C_6$-alkylene, $Z_5$ is $C_1$–$C_4$ alkylene, $Z_6$ is a single bond, methylene or ethylene, $X_1$ is

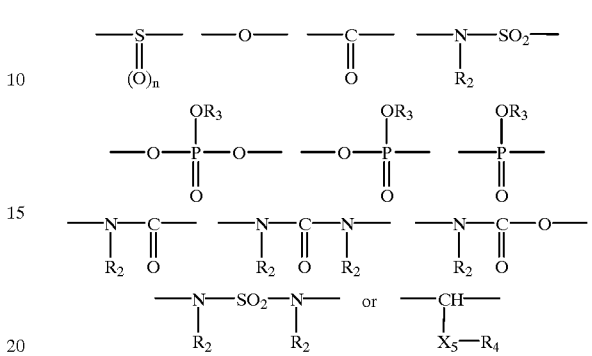

$X_2$ is acyl, acyloxy, acylamino, carboxy, sulpho, a phosphoric acid residue, alkoxy, hydroxy or alkyl, $X_3$ is H or $X_2$, $X_4$ is

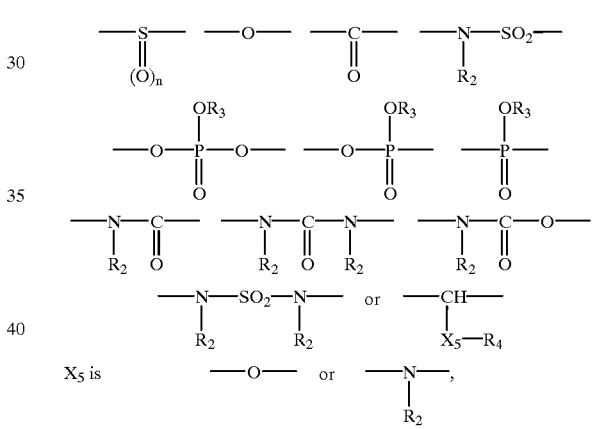

$X_5$ is —O— or —N—,
$\qquad\qquad\qquad\qquad$ |
$\qquad\qquad\qquad\qquad$ $R_2$ $R_2$ is H or alkyl, $R_3$ is H, alkyl or aryl, $R_4$ is acyl, and n is 0, 1 or 2, wherein the compounds which contain an acid group may also exist as the salt, the heterocycle of formula (I) has 5 to 8 ring atoms and the compounds of formulae (I) and (II) have a solubility in water of at least 1 g/l at 20° C. and standard pressure, and either the material or said at least one colored ink contains a water soluble compound of the formula (III) or (IV)

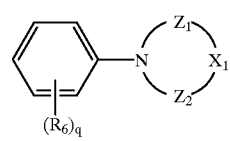 (III)

-continued

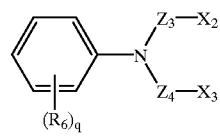
(IV)

$R_6$ is alkyl, alkoxy, acyl, acyloxy, acylamino, sulpho, carboxy or hydroxy, wherein $X_1$, $X_2$, $X_3$, $Z_1$, $Z_2$, $Z_3$ and $Z_4$ are defined above and the compounds of the formulae (III) to (IV) are part of a homo-, co- or a graft polymer via a polymerizable or functional group.

19. The ink jet system as claimed in claim 1, wherein $R_1$ is a substituted or unsubstituted alkyl, wherein the substitutents are hydroxy, nitro, cyano, acyl, acyloxy, acylamino, alkoxy, or aryloxy.

20. The ink jet system as claimed in claim 2, wherein $R_1$ is a substituted or unsubstituted alkyl, wherein the substitutents are hydroxy, nitro, cyano, acyl, acyloxy, acylamino, alkoxy, or aryloxy.

21. The ink jet system as claimed in claim 14, wherein $R_1$ is a substituted or unsubstituted alkyl, wherein the substitutents are hydroxy, nitro, cyano, acyl, acyloxy, acylamino, alkoxy, or aryloxy.

22. An ink jet system comprising a recording material and at least one colored ink to be applied to the recording material by means of an ink jet nozzle, at least the material contains at least one water-soluble compound of the formulae (I) or (II):

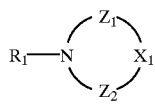
(I)

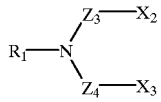
(II)

wherein $R_1$ is H, alkyl, aryl, alkoxy, aryloxy or hydroxy, $Z_1$ is $C_1$–$C_5$-alkylene, $Z_2$ is $C_1$–$C_5$-alkylene or $Z_5$—$X_4$—$Z_6$, $Z_3$ and $Z_4$ are identical or different and are $C_1$–$C_6$-alkylene, $Z_5$ is $C_1$–$C_4$ alkylene, $Z_6$ is a single bond, methylene or ethylene $X_1$ is

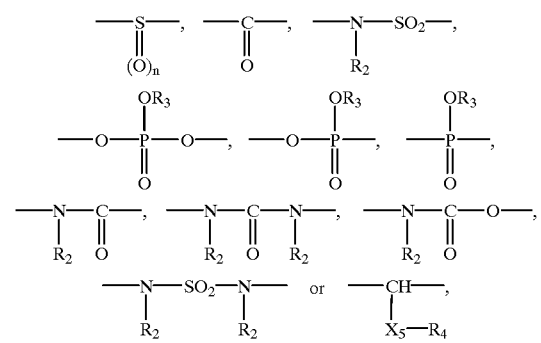

$X_2$ is acyl, acyloxy, acylamino, carboxy, sulpho, a phosphoric acid residue, alkoxy, hydroxy or alkyl, $X_3$ is H or $X_2$, $X_4$ is

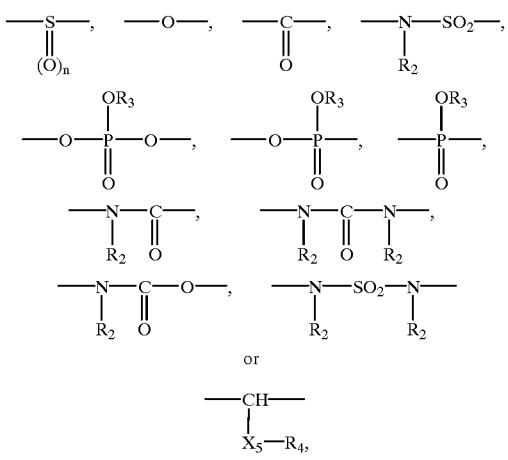

$R_2$ is H or alkyl, $R_3$ is H, alkyl or aryl, $R_4$ is acyl, and n is 1 or 2, wherein the compounds which contain an acid group may also exist as the salt, the heterocycle of formula (I) has 5 to 8 ring atoms and the compounds of formulae (I) and (II) have a solubility in water of at least 1 g/l at 20° C. and standard pressure.

* * * * *